(12) United States Patent
Jungmann

(10) Patent No.: US 9,291,114 B2
(45) Date of Patent: Mar. 22, 2016

(54) GENERATOR INCLUDING A FUEL SHUTOFF VALVE

(71) Applicant: Briggs & Stratton Corporation, Wauwatosa, WI (US)

(72) Inventor: Richard Heinz Jungmann, Richfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 84 days.

(21) Appl. No.: 13/781,522

(22) Filed: Feb. 28, 2013

(65) Prior Publication Data

US 2014/0239645 A1    Aug. 28, 2014

(51) Int. Cl.

| F02M 19/02 | (2006.01) |
|---|---|
| F02D 41/04 | (2006.01) |
| F02D 19/02 | (2006.01) |
| F02M 21/02 | (2006.01) |
| F02D 29/06 | (2006.01) |
| F02M 37/00 | (2006.01) |

(52) U.S. Cl.
CPC ............ *F02D 41/042* (2013.01); *F02D 19/025* (2013.01); *F02D 29/06* (2013.01); *F02M 21/0242* (2013.01); *F02M 21/0293* (2013.01); *F02M 37/0023* (2013.01); *F02D 2200/021* (2013.01); *Y02T 10/32* (2013.01)

(58) Field of Classification Search
CPC .......................... F02D 19/025; F02M 21/0293
USPC ............... 701/107, 112; 123/198 D, 198 DB, 123/198 DC, 529
See application file for complete search history.

(56) References Cited

U.S. PATENT DOCUMENTS

| 6,044,806 | A | * | 4/2000 | Brown et al. .............. 123/27 GE |
|---|---|---|---|---|
| 6,750,556 | B2 | | 6/2004 | Sodemann et al. |
| 6,952,056 | B2 | | 10/2005 | Brandenburg et al. |
| 6,998,725 | B2 | | 2/2006 | Brandenburg et al. |
| 7,015,404 | B2 | | 3/2006 | Sodemann et al. |
| 7,053,497 | B2 | | 5/2006 | Sodemann et al. |
| D617,269 | S | | 6/2010 | Van Deursen |
| D629,748 | S | | 12/2010 | Van Deursen |
| D644,993 | S | | 9/2011 | Van Deursen |
| 8,286,603 | B2 | * | 10/2012 | Sid .............................. 123/179.3 |
| 2003/0230249 | A1 | * | 12/2003 | Yamaoka et al. ............. 123/1 A |
| 2006/0124195 | A1 | * | 6/2006 | Cohen et al. ..................... 141/94 |
| 2008/0047522 | A1 | * | 2/2008 | Leisner et al. ............ 123/198 D |
| 2008/0093862 | A1 | | 4/2008 | Brandenburg et al. |

OTHER PUBLICATIONS

U.S. Appl. No. 12/780,480, filed May 14, 2010, Junk et al.
U.S. Appl. No. 13/089,169, filed Apr. 18, 2011, Gilpatrick.
U.S. Appl. No. 13/358,417, filed Jan. 25, 2012, Janscha et al.
U.S. Appl. No. 29/378,054, filed Oct. 28, 2010, Plato et al.
William E. Williams, Emergency Shut Off Valves, Undated, 12 pages.

* cited by examiner

*Primary Examiner* — Erick Solis
(74) *Attorney, Agent, or Firm* — Foley & Lardner LLP

(57) ABSTRACT

A generator including an enclosure, an internal combustion engine provided within the enclosure, an alternator provided within the enclosure and driven by the internal combustion engine, a fuel supply line for providing fuel to the internal combustion engine, a valve for selectively closing the fuel supply line, the valve biased to a normally closed position, a controller configured to provide a signal to maintain the valve in an open position, and a temperature responsive device configured to interrupt the signal from the controller to the valve upon exposure to a threshold temperature, thereby resulting in the closing of the valve.

17 Claims, 4 Drawing Sheets

GENERATOR INCLUDING A FUEL SHUTOFF VALVE

BACKGROUND

The present application relates generally to the field of standby generators. Standby generators have become popular as sources of limited amounts of power for short-term use. For example, standby generators are often connected to homes or businesses to provide power in situations where the normal power source (e.g., utility power grid) fails. Standby generators generally include a prime mover that consumes fuel to provide mechanical power to a generator or alternator that includes a rotor that rotates to generate useable electricity. The electricity is delivered via a switch, breaker, or other interruptible device to the home, business, or facility for use. Such generators may be provided in an enclosure to protect internal components from tampering and the elements and to manage generator noise and exhaust.

SUMMARY

One embodiment of the invention relates to a generator including an enclosure, an internal combustion engine provided within the enclosure, an alternator provided within the enclosure and driven by the internal combustion engine, a fuel supply line for providing fuel to the internal combustion engine, a valve for selectively closing the fuel supply line, the valve biased to a normally closed position, a controller configured to provide a signal to maintain the valve in an open position, and a temperature responsive device configured to interrupt the signal from the controller to the valve upon exposure to a threshold temperature, thereby resulting in the closing of the valve.

Another embodiment of the invention relates to a fuel shut-off system for a generator including a normally closed valve disposed along a fuel supply line, the valve configured to selectively close the fuel supply line, a controller configured to provide a signal to maintain the valve in an open position, and a temperature responsive device proximate the fuel supply line. The temperature responsive device is configured to interrupt the signal from the controller to the valve upon exposure to a threshold temperature, thereby resulting in the closing of the valve.

Another embodiment of the invention relates to a fuel shut-off system for an engine including an internal combustion engine, a fuel supply line for providing fuel to the internal combustion engine, a valve for selectively closing the fuel supply line, the valve biased to a normally closed position, a controller configured to provide a signal to maintain the valve in an open position, and a sensor configured to interrupt the signal from the controller to the valve upon exposure to one of a threshold temperature and a threshold gas concentration, thereby resulting in the closing of the valve.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
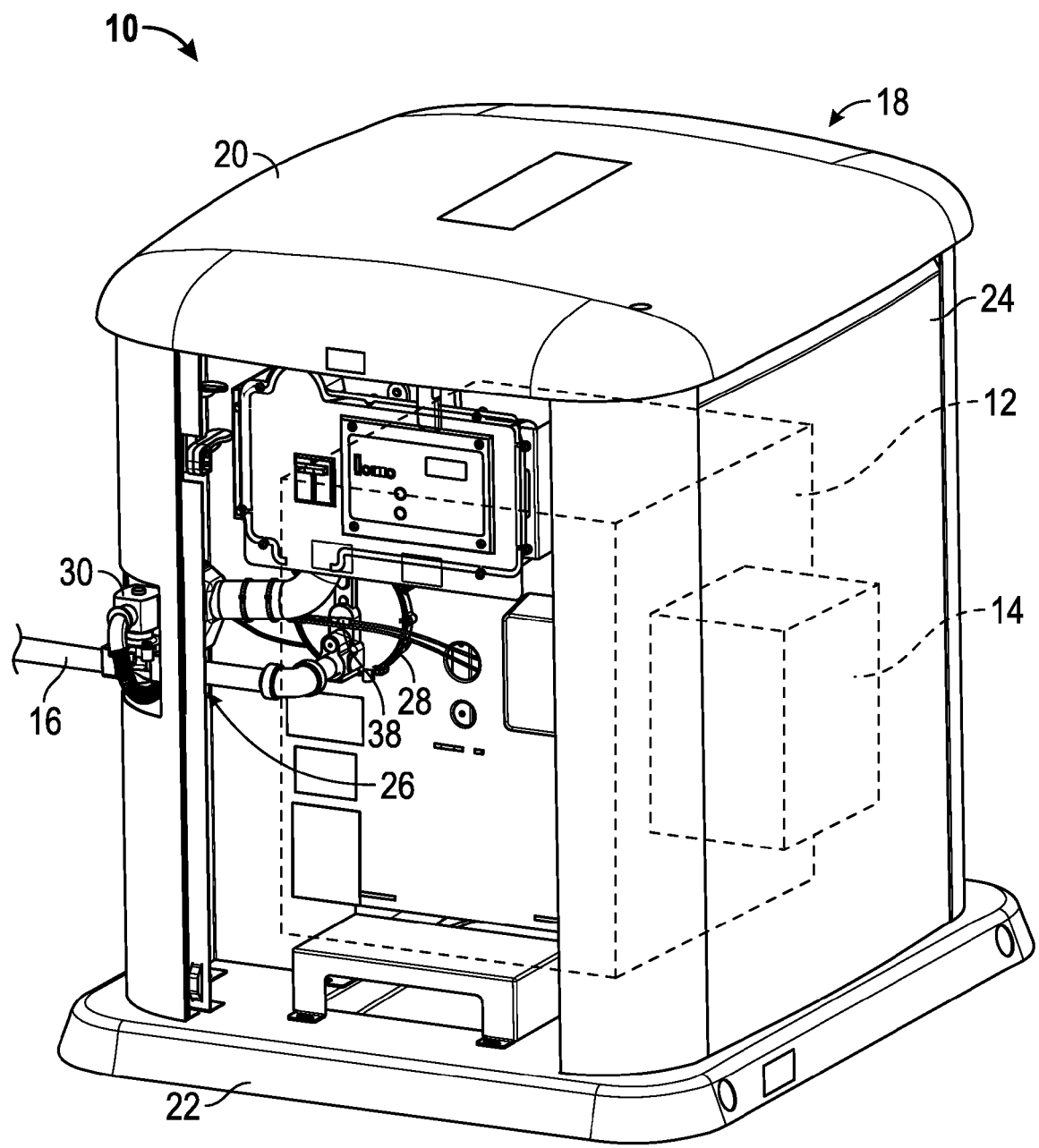
FIG. 1 is an isometric view of a generator with an outer panel removed, in accordance with an exemplary embodiment.

Referring to FIG. 1, a generator is shown as standby generator 10 according to an exemplary embodiment. The generator 10 may be configured to provide power in the event of a utility power failure. According to various exemplary embodiments, the generator 10 may be a home standby generator, a portable generator, or any generator capable of providing power to a distribution panel of a building or to other equipment requiring electrical power.

The generator 10 includes a prime mover, such as an internal combustion engine 12, and an alternator 14. Together, the engine 12 and the alternator 14 may be referred to as an engine-generator set. The engine 12 may be coupled to a gearbox or may be directly coupled to the alternator 14. According to one exemplary embodiment, the engine 12 is an internal combustion engine that consumes a fuel such as propane or natural gas from a fuel supply line 16. The engine 12 may be a horizontal shaft engine or a vertical shaft engine. Other embodiments may utilize other engines or other engine arrangements. The engine 12 may be a single-cylinder engine, a two-cylinder engine, or an engine with three or more cylinders. In other embodiments, the engine 12 may consume other types of fuel, such as gasoline or diesel fuel.

Figure 2:
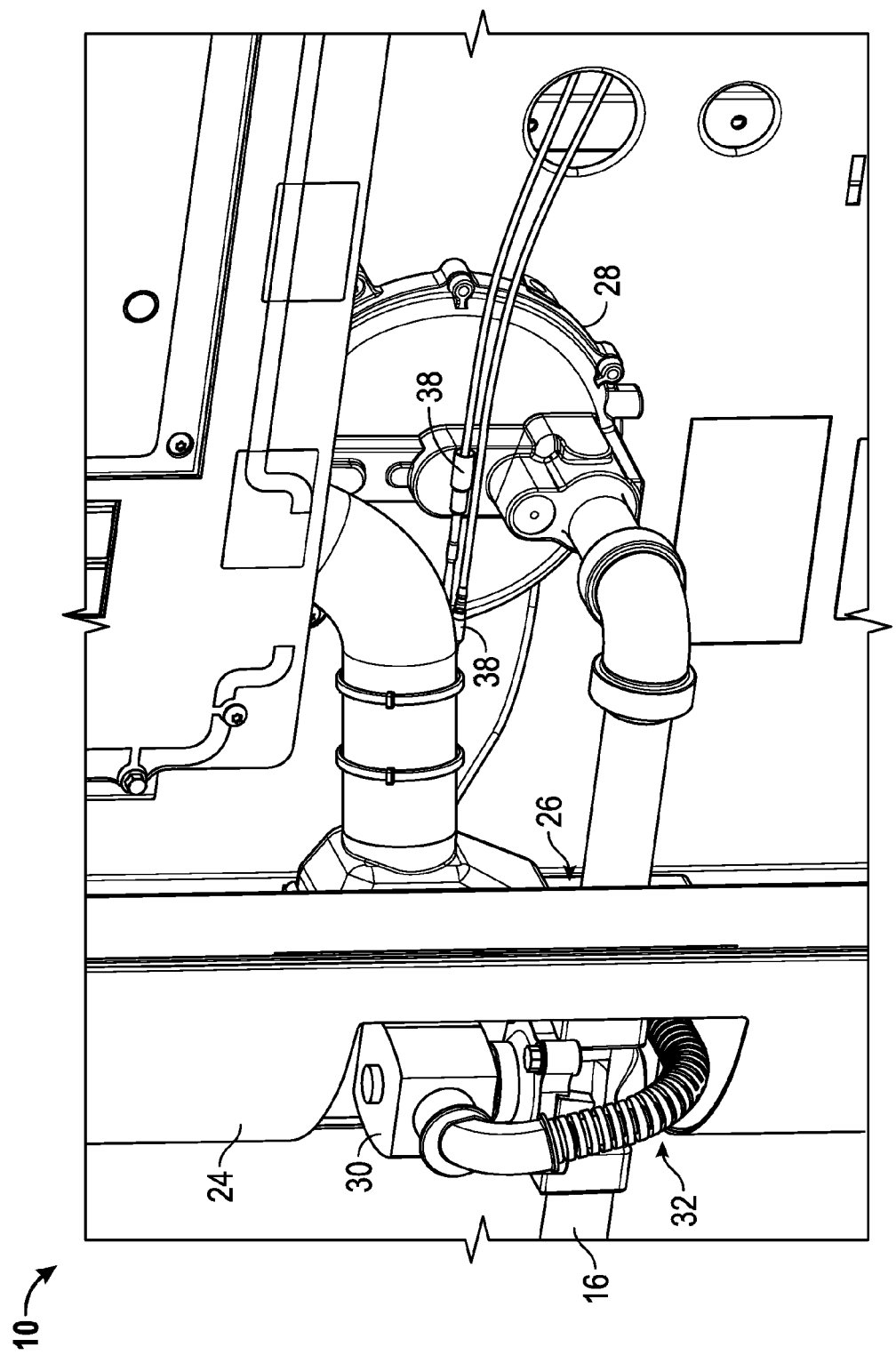
FIG. 2 is a side elevation view of the generator of FIG. 1.

Referring to FIGS. 1 and 2, the engine 12 and the alternator 14 are contained within a housing or enclosure 18. According to an exemplary embodiment, the enclosure 18 is a box-like structure with a top 20 (e.g., lid, cover, roof, etc.), a bottom 22 (e.g., base, platform, etc.), and side walls 24 surrounding the engine 12 and the alternator 14. The side walls 24 may be supported by internal frame members. The panels of the enclosure 18 may be formed of a sheet metal (e.g. aluminum, steel, etc.) or may be formed of another suitable material such as a fiberglass material (e.g., a compressed fiberglass panel). Conventional sheet metal panels may be coupled to an additional insulation panel (e.g., foam insulation with an aluminum or metallic polymer film layer), with the sheet metal providing structural rigidity and the insulation panel providing sound absorption and thermal insulation. While the enclosure 18 is shown as having a rectangular prismatic shape, in other embodiments, the enclosure may be another shape that suitably encapsulates the engine 12 and the alternator 14 (e.g., hemispherical, cylindrical, elliptical, etc.)

As shown in FIG. 2, the fuel supply line 16 enters the interior of the enclosure 18 through an opening, such as an opening 26 in the side walls 24. The fuel supply line 16 may deliver fuel to a device such as a pressure regulator 28 that controls the flow of fuel to the engine 12. The fuel supply line 16 includes an in-line valve 30 configured to selectively allow or prevent the flow of fuel through the supply line 16 to the engine 12. In an exemplary embodiment, the valve 30 is a solenoid valve, such as a direct acting 2-way (e.g., one inlet and one outlet) 8040 Series valve, sold by ASCO Valve. The valve 30 is a normally closed valve that is retained in an open position by an electric current. In the absence of an electric current, the valve 30 is configured to close, preventing the flow of fuel through the supply line 16 to the engine 12. In an exemplary embodiment, the valve 30 is provided external to the enclosure 18, such as in a recess or hollow 32 formed in the side walls 24.

Figure 3:
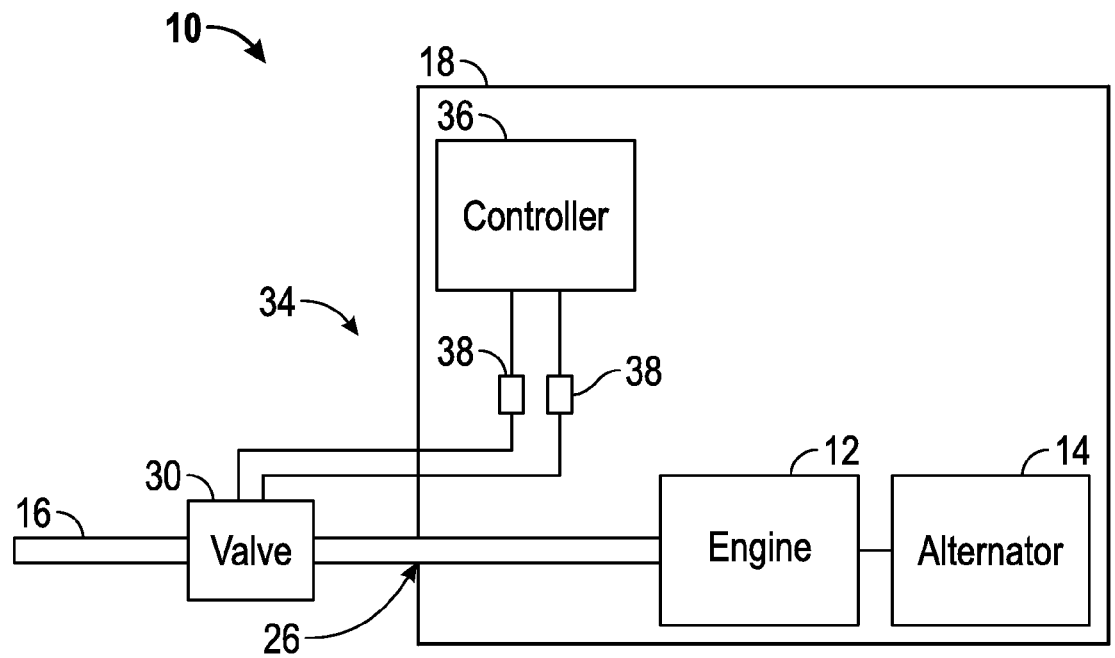
FIG. 3 is a schematic block diagram of the valve control system for the generator of FIG. 1, in accordance with an exemplary embodiment.

Referring now to FIG. 3, a circuit 34 including the valve 30 and a controller or processing circuit 36 for the valve 30 is shown schematically. A processing circuit can include a processor and memory device. The processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

The controller 36 may be an electronic device housed within the enclosure 18, such as a printed circuit board. The controller 36 provides a signal to the valve 30 that moves the valve 30 to the open position. One or more temperature responsive devices 38 are provided in the circuit 34 between the controller 36 and the valve 30 in the interior of the enclosure 18. The temperature responsive devices 38 are configured to break the electrical connection between the controller 36 and the valve 30 when the temperature proximate the devices 38 is above a predetermined threshold temperature, thereby causing the valve 30 to move to the closed position. If the temperature inside the enclosure proximate the devices 38 exceeds the threshold temperature, at least one of the devices 38 breaks or trips so that the signal maintaining the valve 30 in an open position is interrupted, causing the valve 30 to close, stopping the flow of fuel through the supply line 16.

The temperature responsive devices 38 are configured to break the connection between the controller 36 and the valve 30 at a threshold temperature above an expected operating temperature when the engine 12 is operating. In an exemplary embodiment, the expected operating temperature in the interior of the enclosure 18 is between approximately 240° Fahrenheit and 250° Fahrenheit when the engine 12 is operating and the generator 10 is located in an area with elevated ambient temperatures (e.g., the southwestern United States). According to an exemplary embodiment, the temperature responsive devices 38 break the connection between the controller 36 and the valve 30 when the temperature at the device 38 reaches a threshold temperature of approximately 280° Fahrenheit. In other embodiments, the temperature responsive devices 38 break the connection between the controller 36 and the valve 30 at temperatures less than or greater than approximately 280° Fahrenheit.

The temperature responsive devices 38 are positioned within the enclosure 18 proximate one or more locations where elevated temperatures may likely occur. For example, in some embodiments, the temperature responsive devices 38 are located proximate the fuel supply line 16 (e.g., within one foot, six inches, three inches, one inch, etc.).

Figure 4A:
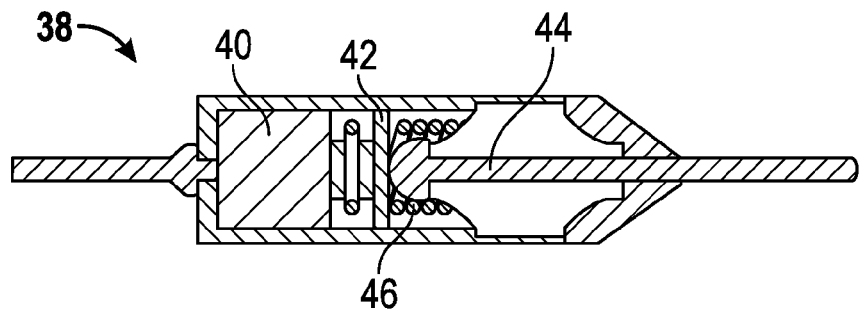
FIG. 4A is a schematic cross-section view of a temperature responsive device for the shut-off valve control system of FIG. 3 in an initial connected configuration.
Figure 4B:
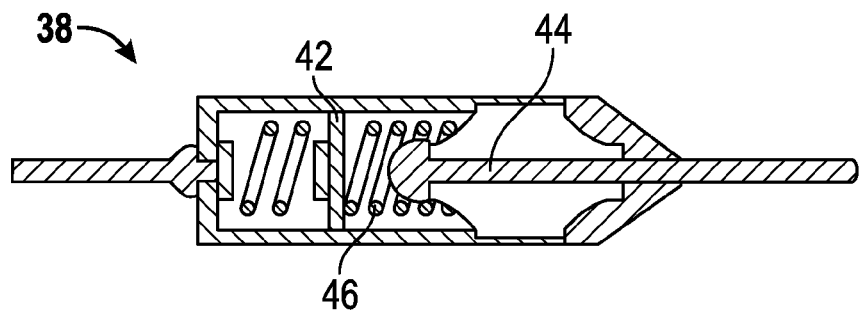
FIG. 4B is a schematic cross-section view of the temperature responsive device for the shut-off valve control system of FIG. 3 in a disconnected configuration.

Referring now to FIGS. 4A and 4B, the temperature responsive device 38 is shown as a thermal cut-off fuse (e.g., a thermal cut-off fuse as sold by Cantherm). The thermal cut-off fuse is a non-resettable thermal fuse that opens electrical contacts when the ambient temperature reaches or exceeds the threshold temperature or predetermined temperature limit. The thermal cut-off fuse is shown to include a thermal element 40 that holds a contact 42 against a lead 44 (see FIG. 4A). When the ambient temperature rises above the predetermined limit, the thermal element 40 melts and a spring 46 moves the contact 42 away from the lead 44 to open the circuit (see FIG. 4B).

In other exemplary embodiments, the temperature responsive device 38 may be another device that opens the circuit 34 to break the connection between the controller 36 and the valve 30 when the ambient temperature inside the enclosure 18 rises above the predetermined limit. For example, in another exemplary embodiment, the temperature responsive device 38 may be a temperature sensor (e.g., thermistor, thermocouple, etc.) configured to sense an elevated temperature and trigger a switch to open the circuit between the controller 36 and the valve 30. Such a temperature sensor (e.g., thermistor, thermocouple, etc.) may be a component of the controller 36. In another exemplary embodiment, a sensor configured to sense the presence of fuel or gas replaces or is used in addition to the temperature responsive devises. The gas sensor is configured to sense the presence of gas or fuel outside of the supply line 16 and may be utilized to trigger a switch to open the circuit between the controller 36 and the valve 30 in response to detecting fuel at or above a threshold value or concentration. For example, the gas sensor (e.g., a gas "sniffer") may be configured to sense the presence of a gas or fuel such as natural gas or propane. Temperature responsive devices 38 and/or fuel sensors may be coupled to the controller 36 or may be mounted elsewhere in the enclosure 18. As shown in FIG. 2, in one exemplary embodiment, the temperature responsive devices 38 may be mounted or suspended inside the enclosure 18 proximate to the fuel supply line 16 between the regulator 28 and the opening 26.

The temperature responsive devices 38 provide a mechanism to close the valve 30 in the fuel supply line 16 with a short response time in the presence of excessively elevated temperatures in the interior of the enclosure 18 of the generator 10. In this way, the flow of fuel to the engine 12 can be halted more quickly than if relying on another mechanism, such as damage to the controller 36, to interrupt the connection between the controller 36 and the valve 30 to close the valve 30. Locating the valve 30 outside of the enclosure 18 and the temperature responsive devices 38 inside the enclosure 18 minimizes the response time of the closing of the valve 30 because the temperature responsive devices 38 are located near likely areas of excessively elevated temperatures while keeping the valve 30 away from the potential area of excessively elevated temperatures, which could potentially cause damage to the valve 30.

Figure 5:
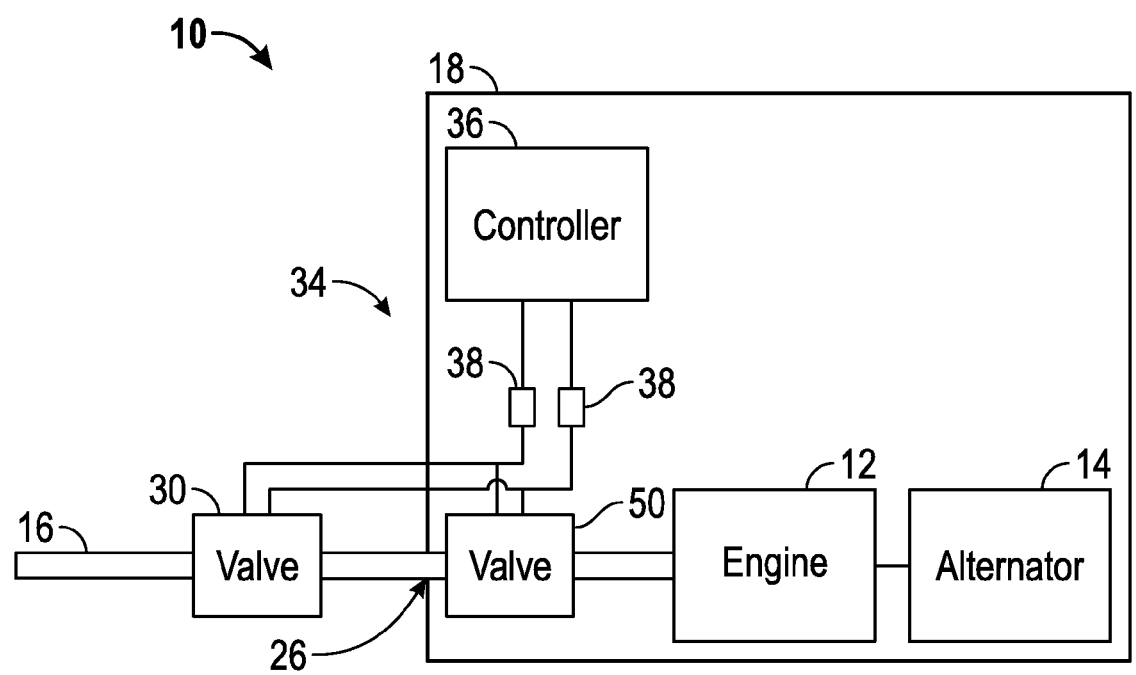
FIG. 5 is a schematic block diagram of the valve control system for the generator of FIG. 1, in accordance with an exemplary embodiment.

Referring now to FIG. 5, in another exemplary embodiment, the generator 10 may include a second valve 50 in addition to the valve 30. The second valve 50 may be disposed inside or outside of the enclosure 18. Either of the valves 30 and 50 may be utilized to stop the flow of fuel through the supply line 16 to the engine 12 and both the valves 30 and 50 may be automatically closed if an elevated temperature is detected by the devices 38 as described above.

In another exemplary embodiment, the fuel supply line 16 may not enter the enclosure 18 through an opening proximate the corner between two side walls 24, as shown in FIGS. 1 and 2. Instead, the supply line 16 may enter through an opening elsewhere on the enclosure 18, such as in one of the side panels 16 at a point away from a corner of the enclosure 18. In another embodiment, the supply line 16 may enter the enclosure through an opening elsewhere, such as in the top 20 or in the bottom 22 of the enclosure 18.

It is important to note that the construction and arrangement of the generator as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A generator, comprising:
   an enclosure;
   an internal combustion engine provided within the enclosure;
   an alternator provided within the enclosure and driven by the internal combustion engine;
   a fuel supply line for providing fuel to the internal combustion engine;
   a valve for selectively closing the fuel supply line, the valve biased to a normally closed position, wherein the valve is provided outside of the enclosure;
   a controller configured to provide a signal to maintain the valve in an open position; and
   a temperature responsive device configured to interrupt the signal from the controller to the valve upon exposure to a threshold temperature, thereby resulting in the closing of the valve.

2. The generator of claim 1, wherein the valve is a solenoid valve.

3. The generator of claim 1, wherein the temperature responsive device is provided within the enclosure proximate the fuel line.

4. The generator of claim 3, wherein the temperature responsive device is a thermal fuse.

5. The generator of claim 4, wherein the temperature responsive device is electrically connected in series between the valve and the controller.

6. The generator of claim 1, wherein the enclosure comprises a hollow in which the valve is disposed.

7. The generator of claim 6, further comprising an opening formed through the enclosure;
   wherein the fuel supply line passes through the opening.

8. A fuel shut-off system for a generator, comprising:
   a generator enclosure
   a normally closed valve disposed along a fuel supply line, the valve configured to selectively close the fuel supply line, wherein the valve is provided outside of the generator enclosure;
   a controller configured to provide a signal to maintain the valve in an open position; and
   a temperature responsive device proximate the fuel supply line and disposed within the generator enclosure;
   wherein the temperature responsive device is configured to interrupt the signal from the controller to the valve upon exposure to a threshold temperature, thereby resulting in the closing of the valve.

9. The fuel shut-off system of claim 8, wherein the temperature responsive device is a thermal fuse.

10. The fuel shut-off system of claim 8, wherein the temperature responsive device is electrically connected in series between the valve and the controller.

11. The fuel shut-off system of claim 10, further comprising a second temperature responsive device electrically connected in series between the controller and the valve and electrically connected in parallel with the first temperature responsive device.

12. The fuel shut-off system of claim 8, further comprising a second normally closed valve disposed along the fuel line and configured to selectively close the fuel supply line.

13. The fuel shut-off system of claim 12, wherein the controller is configured to provide a signal to maintain the second valve in an open position; and
   wherein the temperature responsive device is configured to interrupt the signal from the controller to the second valve upon exposure to a threshold temperature, thereby resulting in the closing of the second valve.

14. The fuel shut-off of claim 8, wherein the temperature responsive device comprises a temperature sensor.

15. A fuel shut-off system for an engine, comprising:
   an engine enclosure;
   an internal combustion engine disposed within the engine enclosure;
   a fuel supply line for providing fuel to the internal combustion engine;
   a valve for selectively closing the fuel supply line, the valve biased to a normally closed position;
   a controller configured to provide a signal to maintain the valve in an open position, wherein the valve is provided outside of the engine enclosure; and
   a sensor configured to interrupt the signal from the controller to the valve upon exposure to one of a threshold temperature and a threshold gas concentration, thereby resulting in the closing of the valve, wherein the sensor is disposed within the engine enclosure.

16. The fuel shut-off system of claim 15, wherein the sensor is a thermal fuse that is configured to interrupt the signal from the controller to the valve upon exposure to a threshold temperature.

17. The fuel shut-off system of claim 15, wherein the sensor is a gas sensor that is configured to interrupt the signal from the controller to the valve upon exposure to a threshold gas concentration.

* * * * *